United States Patent
McIntosh et al.

(10) Patent No.: US 7,496,729 B2
(45) Date of Patent: Feb. 24, 2009

(54) METHOD AND APPARATUS TO ELIMINATE INTERPARTITION COVERT STORAGE CHANNEL AND PARTITION ANALYSIS

(75) Inventors: Gordon D. McIntosh, Austin, TX (US); Gary Lee Ruzek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 10/845,550

(22) Filed: May 13, 2004

(65) Prior Publication Data
US 2005/0268158 A1   Dec. 1, 2005

(51) Int. Cl.
*G06F 12/00* (2006.01)
(52) U.S. Cl. .................. 711/173; 707/205; 711/170; 717/128
(58) Field of Classification Search .............. 707/205; 711/170, 173; 717/128
See application file for complete search history.

(56) References Cited

U.S. PATENT DOCUMENTS

| | | | |
|---|---|---|---|
| 4,837,767 A * | 6/1989 | Hartwell et al. ............... 714/16 |
| 5,168,554 A * | 12/1992 | Luke ........................... 715/209 |
| 5,345,590 A | 9/1994 | Ault et al. |
| 5,642,478 A | 6/1997 | Chen et al. |
| 5,805,790 A | 9/1998 | Nota et al. |
| 5,918,047 A * | 6/1999 | Leavitt et al. .................. 713/2 |
| 6,185,575 B1 | 2/2001 | Orcutt |
| 6,219,771 B1 | 4/2001 | Kikuchi et al. |
| 6,473,830 B2 * | 10/2002 | Li et al. ....................... 711/112 |
| 6,493,837 B1 * | 12/2002 | Pang et al. ..................... 714/45 |
| 6,658,591 B1 | 12/2003 | Arndt et al. |
| 6,681,309 B2 | 1/2004 | Szendy et al. |
| 6,883,116 B2 | 4/2005 | Lee et al. |
| 6,886,064 B2 | 4/2005 | Dawkins et al. |
| 6,910,160 B2 | 6/2005 | Bajoria et al. |
| 2002/0120815 A1 | 8/2002 | Zahavi et al. |
| 2002/0178404 A1 | 11/2002 | Austen et al. |
| 2003/0037225 A1 * | 2/2003 | Deng et al. .................. 712/227 |
| 2003/0056155 A1 | 3/2003 | Austen et al. |
| 2003/0159086 A1 | 8/2003 | Arndt et al. |
| 2005/0060516 A1 | 3/2005 | Bottemiller et al. |

FOREIGN PATENT DOCUMENTS

TW    540036    7/2003

OTHER PUBLICATIONS

Dawkins et al., Method and Apparatus for Preserving Trace Data in a Logical Partitioned Data Processing System, Apr. 29, 2004.

* cited by examiner

*Primary Examiner*—Sanjiv Shah
*Assistant Examiner*—Jae U Yu
(74) *Attorney, Agent, or Firm*—Duke W. Yee; Diana L. Roberts-Gerhardt; Wayne P. Bailey

(57) ABSTRACT

A method, apparatus, and computer instructions in a logical partitioned data processing system for managing trace data. A call is received for the trace data from a calling partition within a plurality of partitions in the logical partitioned data processing system. The trace data in a buffer associated with the calling partition to form identified trace data is identified. Only the identified trace data for the calling partition is returned. The trace data for other partitions within the plurality of partitions is not returned to the calling partition.

14 Claims, 6 Drawing Sheets

++++++++++++++++++++++++++++++++++++++++++++++++
```
int64_t
read_trace (int64_taddr, struct io_struct*ios)
{
  /*A byte count of zero indicates that all trace data */
  /* has been transferred.
  if (trace_save_area.byte_count = = 0) {
    ios->resid = ios->xfer_length;
  }
  else if (trace_save_area.byte_count>ios->xfer_length) {
  /*There is more data to copy out than provided by   */
  /*space in the user buffer.   Thus, copy in the max */
  /*amount of data the buffer will contain.           */

If service partition {
       Memcpy64 (void*) addr,
                (void*) trace_save_area.current_data_ptr,
                ios->xfer_length) ;

}else {
        while (trace data available) {
           if ( trace data record belongs to current partition)
                copy record to user buffer
        }
    } trace_save_area.byte_count-=ios->xfer_length;
      trace_save_area.current_data_ptr =
           (void*) ((uint64_t) trace_save_area.current_data_ptr+
           ios->xfer_length) ;
    /*There is no residual data.*/
    ios->resid = 0 ;
  }
  else{
  /*The user buffer provided can hold all remaining trace*/
  /*data.   Counters are zeroed to reflect this.         */
      memcpy64 ((void*) addr,
          (void*) trace_save_area.current_data_ptr,
             trace_save_area.byte_count) ;
    ios->resid = ios->xfer_length - trace_save_area.byte_cou
    /* All data has been transferred so set the byte count*/
    /* to zero.
      trace_save_area.byte_count = 0 ;
  }
  /*There is currently no failure reason for this routine,   *
  /*however, a return code will be passed given the future   *
  /*possibility of memcpy adding a return code.     */
```

METHOD AND APPARATUS TO ELIMINATE INTERPARTITION COVERT STORAGE CHANNEL AND PARTITION ANALYSIS

BACKGROUND OF THE INVENTION

CROSS REFERENCE TO RELATED APPLICATIONS

The present invention is related to an application entitled "Method and Apparatus for Preserving Trace Data in a Logical Partitioned Data Processing System", Ser. No. 10/835,497, filed on Apr. 29, 2004, assigned to the same assignee, and incorporated herein by reference.

1. Technical Field

The present invention relates generally to an improved data processing system and in particular to a method and apparatus for processing data. Still more particularly, the present invention relates to a method, apparatus, and computer instructions for managing trace data in a logical partitioned data processing system.

2. Description of Related Art

Increasingly large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocatable resources include one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image.

Thus, each image of the operating system or each different operating system directly controls a distinct set of allocatable resources within the platform. With respect to hardware resources in a logical partitioned data processing system, these resources are disjointly shared among various partitions. These resources may include, for example, input/output (I/O) adapters, memory DIMMs, non-volatile random access memory (NVRAM), and hard disk drives. Each partition within an LPAR data processing system may be booted and shut down over and over without having to power-cycle the entire data processing system.

When a logical partitioned data processing system experiences a failure, data relating to processes and system states are needed to help identify and analyze the failure. In current logical partitioned data processing systems, some of the data needed to diagnose a failure is not available because of the current design of the systems. For example, the platform firmware includes a trace facility to allow for tracing of code paths in the firmware. An example of platform firmware used in logical partitioned data processing systems is a hypervisor, which is available from International Business Machines Corporation.

With the currently used trace facilities, trace information showing the code path taken in the platform firmware and critical data values are written into a trace buffer as each partition makes platform firmware calls. This trace information is particularly critical when an error is encountered by a partition and the error path is traced along with critical data values.

Currently all logical partitioned mode data processing system platforms support a hypervisor trace facility used to write hypervisor code execution trace point data into a trace buffer located in hypervisor space during hypervisor execution. This hypervisor trace data is critical for effective failure analysis in the field in the event of system failures.

All hypervisor call trace points use the same trace buffer and are identified by calling a partition number, including the partition manager which is assigned partition 0. Because the hypervisor is static in terms of memory allocation, this buffer is of fixed length and must be large enough for the maximum number of partitions for the platform. When the trace data is needed it may be retrieved from any partition using an operating system command, such as the Advanced Interactive Executive (AIX) operating system command "fetchdog". This command loads a special Interactive Executive (AIX) operating system device driver that makes a hypervisor call to copy the trace data into partition space.

Because this command collects the contents of the entire hypervisor trace buffer it allows data from all partitions including the partition manager to be retrieved by a single partition, exposing the logical partitioned data processing system to security vulnerabilities. These security vulnerabilities include bi-directional covert storage channels, analysis of partition operation by another partition, and analysis of hypervisor operations.

Bi-directional covert storage channels can be established between partitions. All evidence of the communication is removed by the system periodically because the trace buffer is organized as a circular buffer. As more data is written into the buffer, old data is eventually overwritten. The channel stores the data for a period long enough to be an effective means of data transfer at very high data rates.

The operations that occur in establishing a bi-directional covert storage channel include having the transmitting partition make a hypervisor call using encoded input parameters. These parameters are written into the hypervisor trace buffer by the hypervisor trace facility. The receiving partition makes successive calls to retrieve the trace data using the "fetchdbh" command or directly calls the hypervisor using the call "h_hypervisor_debug( )" to retrieve the trace data. The receiving partition can filter the trace data by partition and when key patterns are detected for known calls to complete the covert channel communication path. Additionally, the receiving partition also can act as the transmitter by making hypervisor calls using encoded input parameters. This process may be used to establish full bi-directional covert "sockets" between partitions.

An additional security vulnerability is the analysis of a partition's operation by another partition. This type of analysis may be made by the analyzing partition making each hypervisor call and reads the trace buffer to establish the characteristics of each hypervisor call. The analyzing partition makes successive calls to retrieve trace data. Then, by simple analysis using the data obtained by reading the trace buffer, the partition may infer what all other partitions are engaged in and develop an attack methodology.

Another security vulnerability is the analysis of platform firmware operations, such as those operations by a hypervisor. By monitoring the values returned from each trace point and in particular the values for the partition manager, it may be possible to develop attack methods capable of launching effective interpartition attacks, as well as attacks intended to crash the entire machine.

Therefore, it would be advantageous to have an improved method, apparatus, and computer instructions for eliminating security vulnerabilities related to trace data.

SUMMARY OF THE INVENTION

The present invention provides a method, apparatus, and computer instructions in a logical partitioned data processing system for managing trace data. A call is received for the trace data from a calling partition within a plurality of partitions in the logical partitioned data processing system. The trace data in a buffer associated with the calling partition to form identified trace data is identified. Only the identified trace data for the calling partition is returned. The trace data for other partitions within the plurality of partitions is not returned to the calling partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram of code for a transferring trace data in accordance with a preferred embodiment of the present invention.

DETAILED DESCRIPTION OF THE PREFERRED EMBODIMENT

Figure 1:
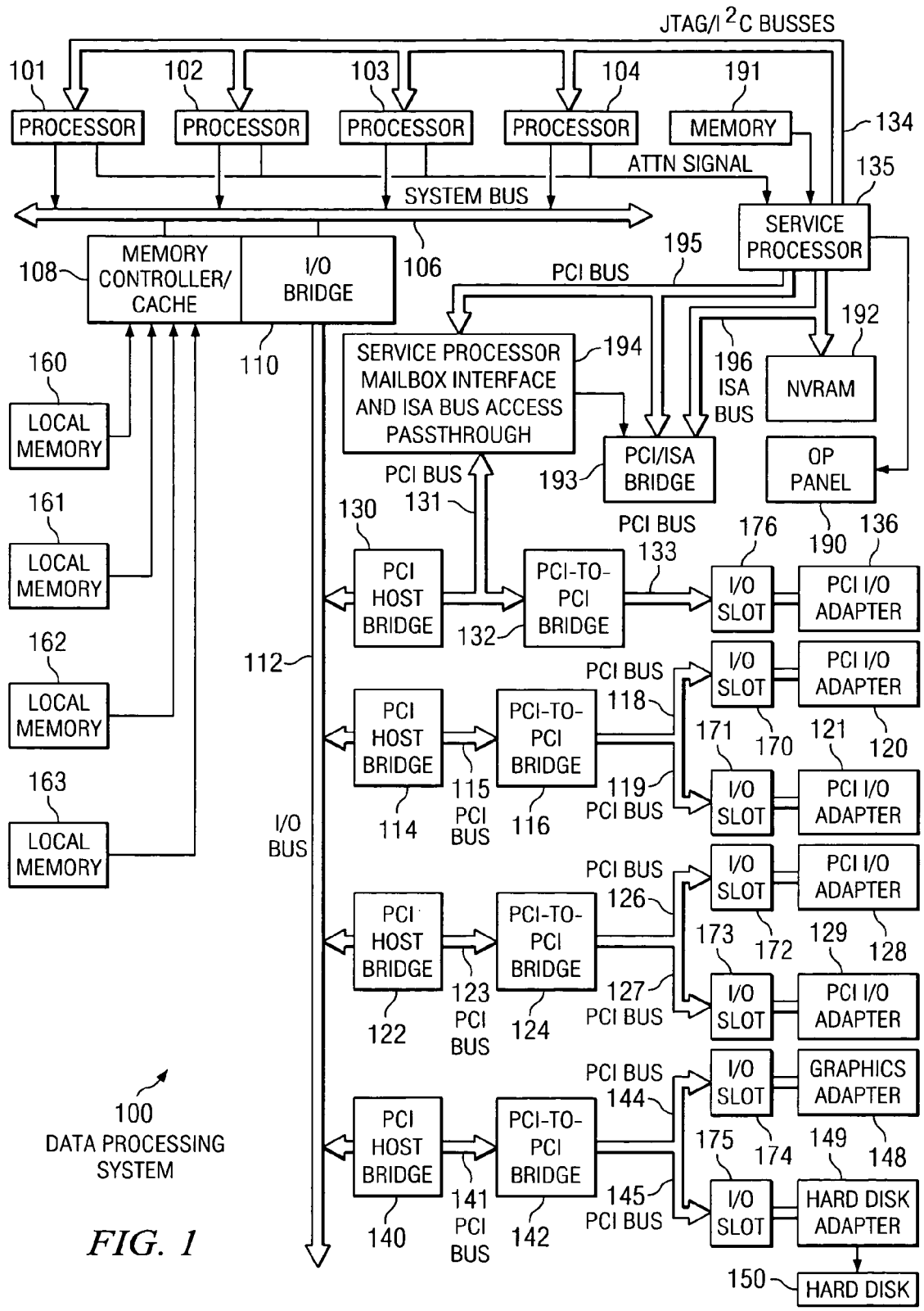
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-

129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
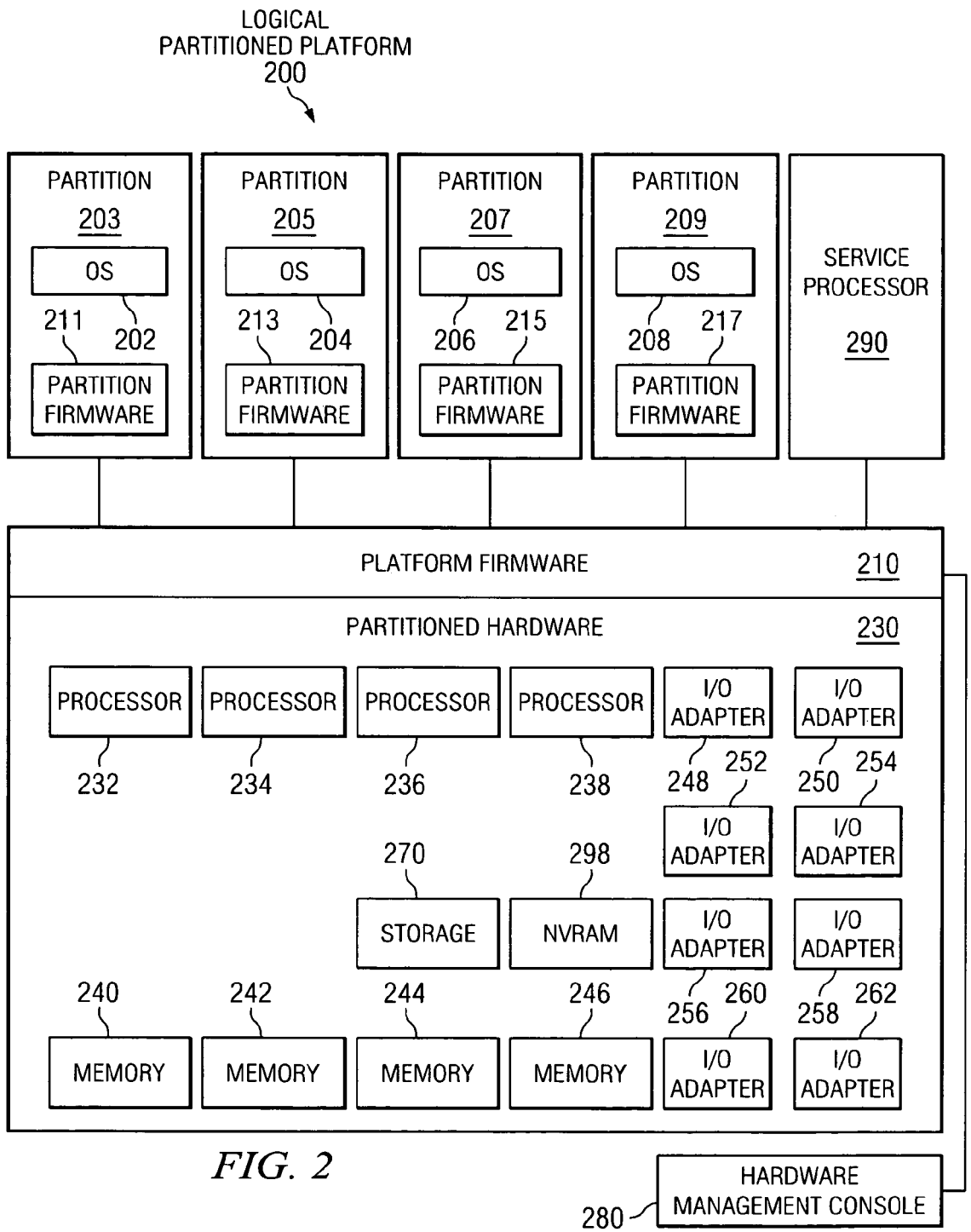
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The present invention provides a method, apparatus, and computer instructions for managing trace data in a manner that reduces security vulnerabilities. In particular, bi-directional covert storage channels, analysis of partition operations by another partition, and analysis of platform firmware operations are prevented. The mechanism of the present invention employs a filter to select the data that is returned in response to a call from a partition for trace data. This filter returns only trace data associated with the calling partition. Other data for other partitions is not returned. With a selected partition, such as a service partition, security vulnerabilities are not a large concern.

Figure 3A:
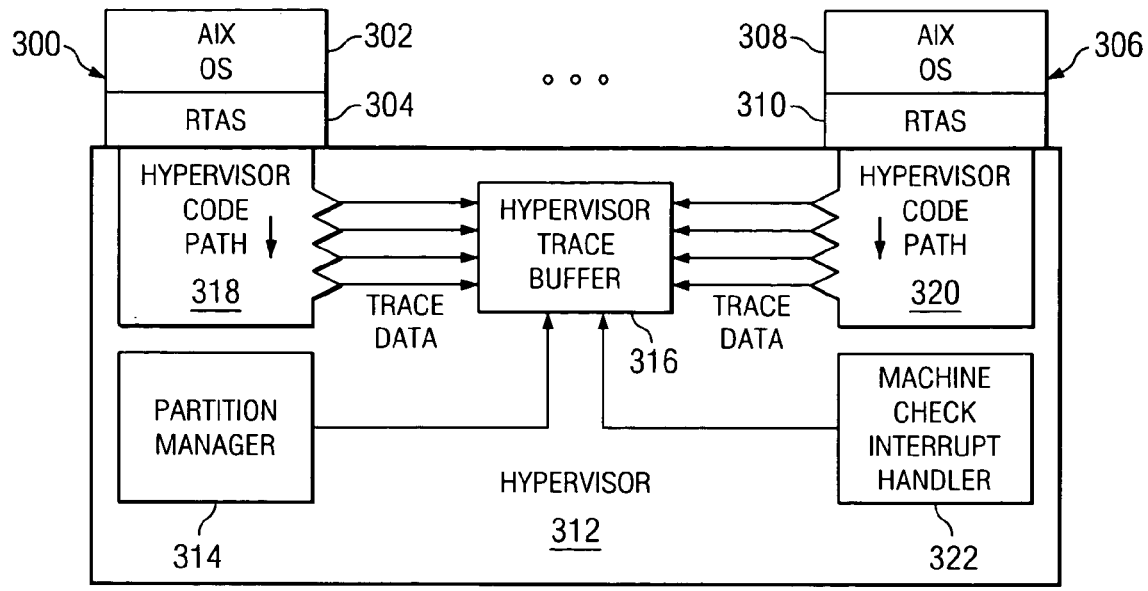
FIGS. 3A and 3B are diagrams of components in a presently available logical partitioned data processing system used to process trace data.
Figure 3B:
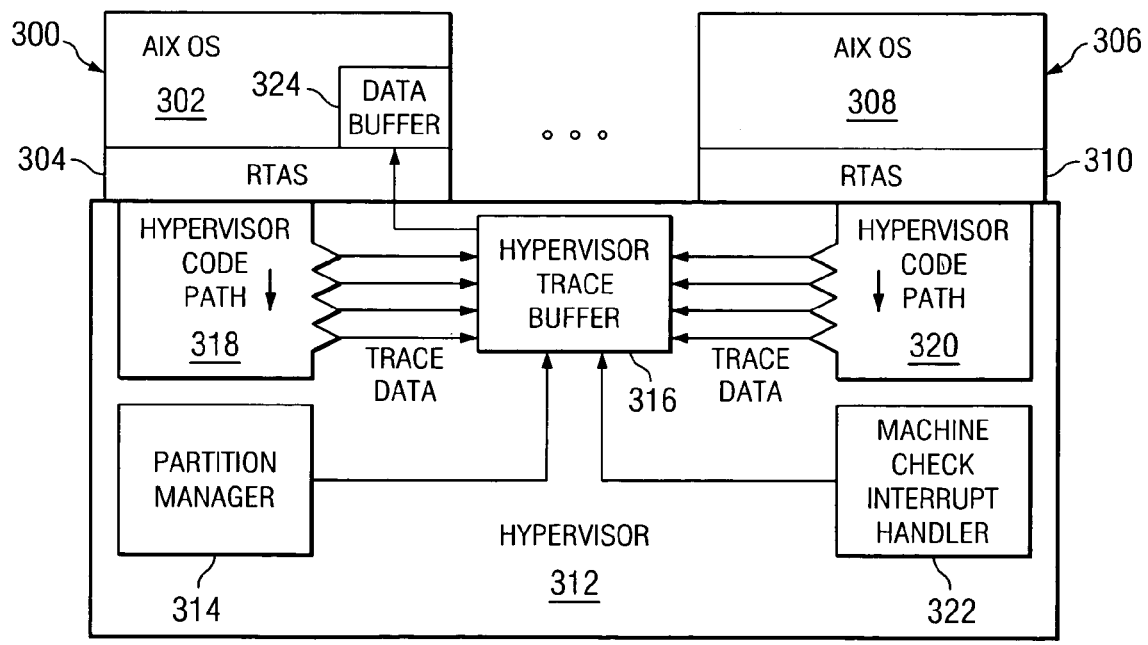

With reference now to FIGS. 3A and 3B, a diagram of components in a presently available logical partitioned data processing system used to process trace data is shown. In this illustrative example, partition 300 contains operating system 302 and RTAS 304 in FIG. 3A. Partition 306 contains operating system 308 and RTAS 310. In these depicted embodiments, up to 255 partitions may be present. All of these partitions are managed through platform firmware, such as hypervisor 312.

Partition manager 314 writes trace information into hypervisor trace buffer 316 as code path 318. This trace information is written as this component makes calls to hypervisor 312. Partition manager 314 is a component within hypervisor 312. This component is used to manage the partitions and includes functions, such as starting and terminating partitions. The calls made by partition manager 314 are stored within hypervisor trace buffer 316.

In a similar fashion, as calls are made by partition 306 to hypervisor 312, hypervisor code path 320 is formed with the trace data for these calls being stored in hypervisor trace buffer 316. In a similar fashion, hypervisor code path 320 is formed as calls are received by hypervisor 312 by partition 306. The trace data for this path also is stored in hypervisor trace buffer 316.

As each partition is activated, the operating system is loaded and starts executing. As an operating system, such as operating system 302, needs platform resources, the operating system makes RTAS calls to RTAS 304, which in turn make hypervisor calls to hypervisor 312. As a hypervisor call executes, special "trace points" are executed in which trace data is written into hypervisor trace buffer 316, with no segregation of partition data. In other words, all of the trace data for all calls by all of the partitions are placed into this buffer.

Not only is the hypervisor data executing hypervisor calls on behalf of the partitions being written into a single buffer, but partition manager 314, which is a hypervisor facility, is also writing its trace data to the same trace buffer. Additionally, machine check interrupt handler 322 uses the same trace facility and stores information in hypervisor trace buffer 316.

In normal debug operations to retrieve the trace data in FIG. 3B, partition 300 establishes data buffer 324 and makes a call to the "h_hypervisor_debug( )" routine. The execution of this call causes the raw hypervisor trace data to be copied into partition space for analysis. In this particular example, the data is copied to data buffer 324. No restriction on the transfer of data is currently made when such a call occurs. This type of unrestricted copying of data also allows a covert storage channel be established between two partitions.

As a result, the data in data buffer 324 may be passed by a series of hypervisor calls from partition 306 into hypervisor trace buffer 316 in the trace facility provided by hypervisor 312. This trace data for partition 306 located in hypervisor trace buffer 316 may be retrieved by partition 300 using the "h_hypervisor_debug( )" hypervisor call. This call and other specific calls described herein are calls that are presently available in hypervisor products. In this manner, a covert storage channel may be established. Additionally, a partition, such as partition 306 may retrieve trace data generated by partition manager 314 and machine check interrupt handler 322 from hypervisor trace buffer 316. This information allows for analysis of operations by partitions and hypervisor operations.

Figure 4:
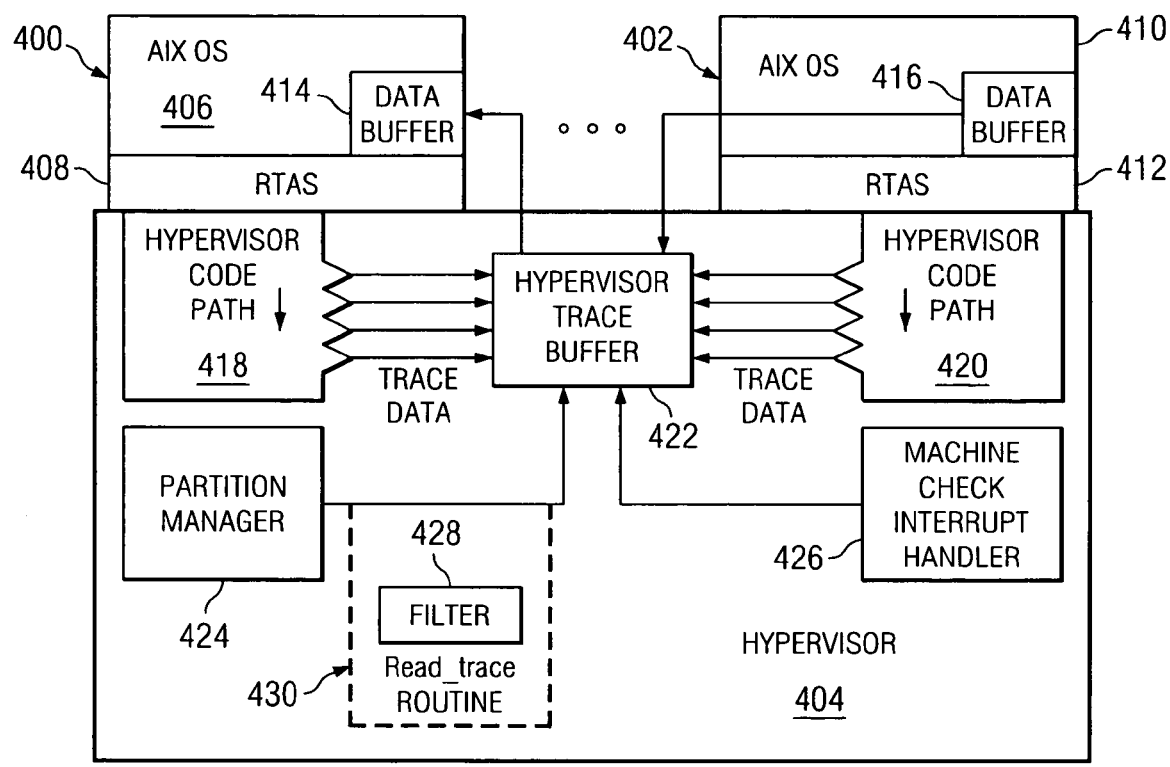
FIG. 4 is a diagram of a configuration for managing trace data to eliminate security vulnerabilities in accordance with a preferred embodiment of the present invention.

With reference now to FIG. 4, a diagram of a configuration for managing trace data to eliminate security vulnerabilities is depicted in accordance with a preferred embodiment of the present invention. In this illustrative example, partition 400 and partition 402 are present and managed through hypervisor 404. Partition 400 contains operating system 406 and RTAS 408, while partition 402 contains operating system 410 and RTAS 412. In this example, operating system 400 also includes data buffer 414 and operating system 402 contains data buffer 416. As partition 400 or partition 402 generates calls to hypervisor 404, hypervisor code path 418 and hypervisor code path 420 are generated with the trace data being stored in hypervisor trace buffer 422.

Further, partition manager 424 may generate calls in which trace data is stored in hypervisor trace buffer 422. Machine check interrupt handler 426 also stores data in hypervisor trace buffer 422. In this illustrative example, filter 428 also is present in hypervisor 404. This filter is used in these examples to restrict the data that is returned when calls for trace data are received by hypervisor 404.

In the illustrative examples, the covert channel between partitions is eliminated through the application of a simple filter algorithm in filter 428. This filter is employed in the "h_hypervisor_debug( )" call in these illustrative examples. This routine calls read_trace ( ) routine 430 to actually transfer the trace data.

The mechanism of the present invention modifies this routine by adding filter 428 to select data that is to be returned in response to a call for trace data. Filter 428 prevents unrestricted data transfer from hypervisor trace buffer 422 to a partition, such as partition 400. In the depicted examples, filter 428 uses the current partition number identified from the call by the partition and a data field within the trace buffer, identifying which partition the data belongs, as inputs to a filter algorithm or process.

Data in hypervisor trace buffer 422 is arranged as records. In the illustrative examples, each record in hypervisor trace buffer 422 is created when trace data is generated by a call from a partition. The partition originating the call that generated the trace data in the record is identified in a data field in the record. The filtering mechanism of the present invention in filter 428 compares the identification of the calling partition with the identification of the partition associated with a record in hypervisor trace buffer 422.

This filter only passes the calling partition's data to that partition except in cases where the calling partition is identified as the "service partition". In these illustrative examples, the service partition is a partition that is given special permissions to perform service functions like code update. Because the platform administrator must assign the service partition using the hardware management console, it is assumed that this partition is secure and no covert data will be received by this partition.

In this manner, covert channels between partitions are prevented. With the restriction of data transfer by filter 428, the analysis of partition operation by another partition and the analysis of hypervisor operation are eliminated.

Figure 5:
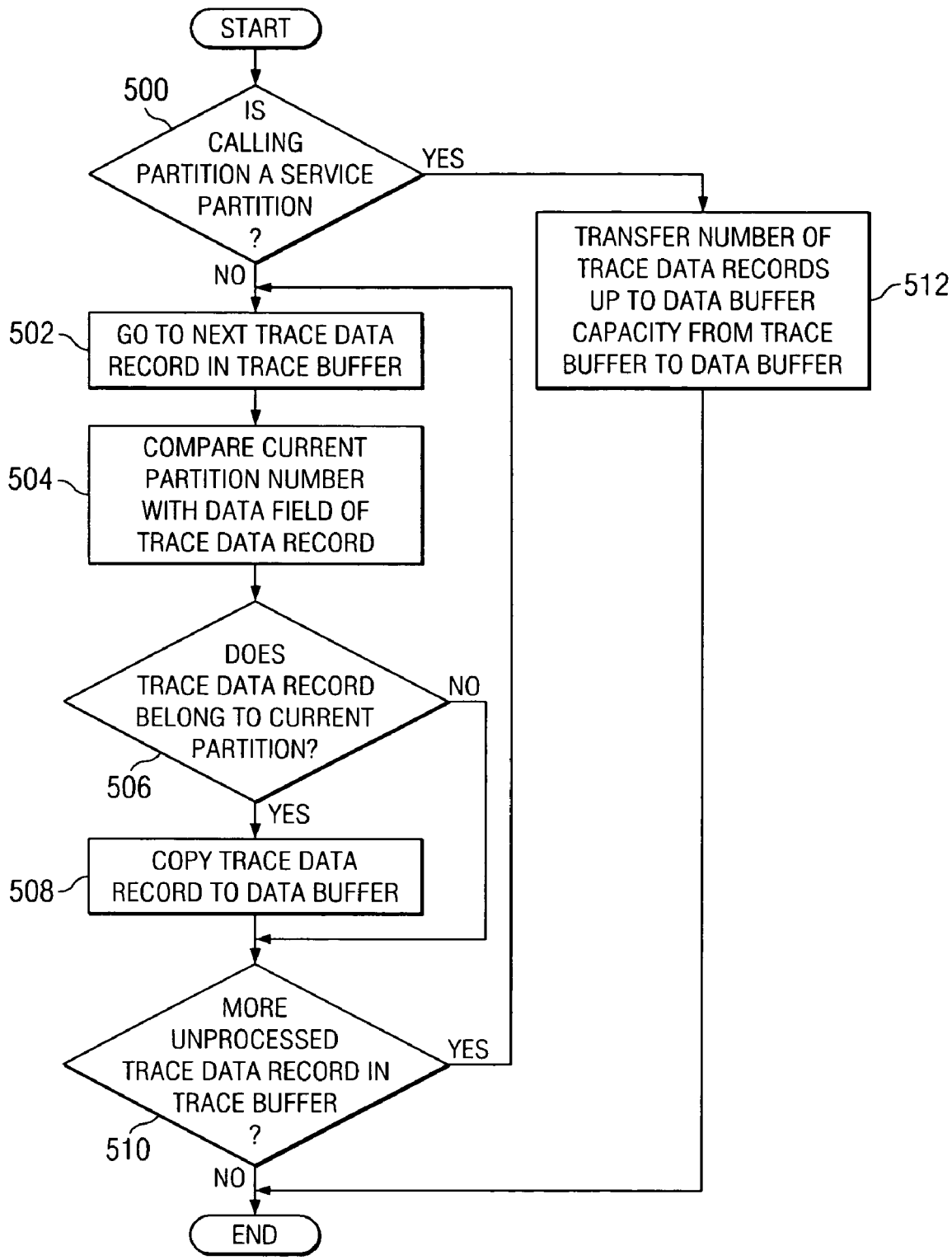
FIG. 5 is a flowchart of a process for returning trace data in response to a call for trace data in a partition in accordance with a preferred embodiment of the present invention.

With reference now to FIG. 5, a flowchart of a process for returning trace data in response to a call for trace data in a partition is depicted in accordance with a preferred embodiment of the present invention. The process illustrated in FIG. 5 may be implemented in a filter, such as filter 428 located in read_trace routine 430 in FIG. 4.

The process begins in response to receiving a call or request for trace data from a partition. This request includes an identification of the calling partition, such as a partition number or an address, and an identification of the data buffer. A determination is made as to whether the calling partition is a service partition (step 500). Service partitions in these illustrative examples are not considered potential security risks. If the calling partition is not a service partition, the process goes to the next unprocessed trace data record in the trace buffer (step 502). In these illustrative examples, the data is organized as a number of records in the trace buffer.

Next, the current partition number is compared with the data field of the trace data record (step 504). The data field in the trace record includes an identification of the partition making the hypervisor call that resulted in the generation of the data in the trace record. Thereafter, a determination is made as to whether the trace data record belongs to the current partition (step 506). If the trace data record belongs to the current partition, the trace data record is copied to data buffer (step 508). Then, a determination is made as to whether more unprocessed trace data records are present in trace buffer (step 510). If more unprocessed trace data records are not present in trace buffer, then the process terminates.

Referring back to step 500, if the calling partition is a service partition, then the number of trace data records up to data buffer capacity are transferred from trace buffer to the data buffer (step 512) with the process terminating thereafter. In step 506, if the trace data record does not belong to the current partition, the process proceeds to step 510 as described above. In step 510, if more unprocessed trace data records are present in trace buffer then the process proceeds to step 502 as described above.

Turning next to FIG. 6, a diagram of code for transferring trace data is depicted in accordance with a preferred embodiment of the present invention. The code illustrated in FIG. 6 may be implemented as a call in platform firmware, such as hypervisor 404 in FIG. 4. In particular, the illustrated code may be implemented in a data transfer routine, such as read_trace routine 430 in FIG. 4.

In these illustrative examples, the h_hypervisor_debug( ) routine performs initial processing, then calls read_trace( ) routine 600 to transfer the trace data. The filter mechanism of the present invention is located in this routine. In this example, read_trace( ) routine 600 is an example implementation of the process depicted in FIG. 5 above. The filter mechanism of the present invention is implemented in section 602 of read_trace( ) routine 600.

Thus, the present invention provides an improved method, apparatus, and computer instructions for securing trace data. The mechanism of the present invention receives requests from partitions for trace data and returns only data for the requesting partition from the trace buffer. In this manner, covert channels between partitions may be eliminated through the use of the filtering mechanism of the present invention. As a result, security vulnerabilities are reduced or eliminated in the handling of trace data by platform firmware.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system for managing trace data, the method comprising:

receiving a call for the trace data from a calling partition within a plurality of partitions in the logical partitioned data processing system, wherein the call for the trace data requests that preexisting trace data to be provided to the calling partition;

identifying the trace data in a buffer associated with the calling partition to form identified trace data;

returning only the identified trace data for the calling partition, wherein other trace data for other partitions within the plurality of partitions that is actively maintained within the logical partitioned data processing system is not returned to the calling partition; and responsive to the calling partition being a service partition, returning all the trace data requested by the call to the service partition, wherein the trace data in the buffer comprises trace data for each of a plurality of partitions in the logical partitioned data processing system, wherein at least some of the plurality of partitions in the logical partitioned data processing system each simultaneously execute an operating system therein, and wherein the receiving step, the identifying step, and the returning step are performed by platform firmware, wherein the platform firmware also loads a copy of boot strap code onto the partitions of the logical partitioned data processing system when the partitions are instantiated.

2. The method of claim 1, wherein the trace data comprises a plurality of records, with each record including a partition identification of what partition generated the record, wherein the identifying step uses the partition identification to identify particular portions of the trace data in the buffer that is associated with the calling partition, and wherein the returning step returns the identified trace data to a data buffer in the calling partition.

3. The method of claim 1, wherein the returning step comprises:
- identifying an amount of free space present in a data buffer for the calling partition; and
- returning only a portion of the identified trace data for the calling partition that fits within the data buffer.

4. The method of claim 1, wherein the call includes an identification of the calling partition and an identification of a data buffer associated with the calling partition.

5. A logical partitioned data processing system for managing trace data, the data processing system comprising:
- receiving means for receiving a call for the trace data from a calling partition within a plurality of partitions in the logical partitioned data processing system, wherein the call for the trace data requests that preexisting trace data be provided to the calling partition;
- identifying means for identifying particular portions of the trace data in a buffer associated with the calling partition to form identified trace data;
- first returning means for returning only the identified trace data for the calling partition, wherein other trace data for other partitions within the plurality of partitions that is actively maintained within the logical partitioned data processing system is not returned to the calling partition; and
- second returning means, responsive to the calling partition being a service partition, for returning all the trace data requested by the call to the service partition, wherein the trace data in the buffer comprises trace data for each of a plurality of partitions in the logical partitioned data processing system, wherein at least some of the plurality of partitions in the logical partitioned data processing system each simultaneously execute an operating system therein, and wherein the receiving means, the identifying means, and the returning means are performed by platform firmware, wherein the platform firmware also loads a copy of boot strap code onto the partitions of the logical partitioned data processing system when the partitions are instantiated.

6. The data processing system of claim 5, wherein the trace data in the buffer comprises trace data for each of a plurality of partitions in the logical partitioned data processing system.

7. The data processing system of claim 5, wherein the trace data comprises a plurality of records, with each record including a partition identification of what partition generated the record, wherein the identifying means uses the partition identification to identify the particular portions of the trace data in the buffer that is associated with the calling partition, and wherein the returning means returns the identified trace data to a data buffer in the calling partition.

8. The data processing system of claim 5, wherein the returning means comprises:
- means for identifying an amount of free space present in a data buffer for the calling partition; and
- means for returning only a portion of the identified trace data for the calling partition that fits within the data buffer.

9. The data processing system of claim 5, wherein the call includes an identification of the calling partition and an identification of a data buffer associated with the calling partition.

10. A computer program product in a recordable-type computer readable medium for managing trace data, the computer program product comprising:
- first instructions for receiving a call for the trace data from a calling partition within a plurality of partitions in a logical partitioned data processing system, wherein the call for the trace data requests that preexisting trace data be provided to the calling partition;
- second instructions for identifying particular portions of the trace data in a buffer associated with the calling partition to form identified trace data;
- third instructions for returning only the identified trace data for the calling partition, wherein other trace data for other partitions within the plurality of partitions that is actively maintained within the logical partitioned data processing system is not returned to the calling partition; and
- fourth instructions, responsive to the calling partition being a service partition, for returning all the trace data requested by the call to the service partition, wherein the trace data in the buffer comprises trace data for each of a plurality of partitions in the logical partitioned data processing system, wherein at least some of the plurality of partitions in the logical partitioned data processing system each simultaneously execute an operating system therein, and the third instructions are performed by platform firmware, wherein the platform firmware also loads a copy of boot strap code onto the partitions of the logical partitioned data processing system when the partitions are instantiated.

11. The computer program product of claim 10, wherein the trace data comprises a plurality of records, with each record including a partition identification of what partition generated the record, wherein the second instructions use the partition identification to identify the particular portions of the trace data in the buffer that is associated with the calling partition, and wherein the third instructions returns the identified trace data to a data buffer in the calling partition.

12. The computer program product of claim 10, wherein the third instructions comprises:
- first sub-instructions for identifying an amount of free space present in a data buffer for the calling partition; and
- second sub-instructions for returning only a portion of the identified trace data for the calling partition that fits within the data buffer.

13. The computer program product of claim 10, wherein the call includes an identification of the calling partition and an identification of a data buffer associated with the calling partition.

14. A data processing system comprising:
- a bus system;
- a memory unit connected to the bus system, wherein the processing unit executes a set of instructions to receive a call for a trace data from a calling partition within a plurality of partitions in a logical partitioned data processing system, wherein the call for the trace data requests that preexisting trace data to be provided to the calling partition; identify particular portions of the trace data in a buffer associated with the calling partition to form identified trace data; return only the identified trace data for the calling partition, wherein other trace data for other partitions within the plurality of partitions that is actively maintained within the logical partitioned data processing system is not returned to the calling partition; and responsive to the calling partition being a service partition, return all the trace data requested by the call to the service partition, wherein the trace data in the buffer comprises trace data fro each of a plurality of partitions in the logical partitioned data processing system, wherein at least some of the plurality of partitions in the logical partitioned data processing system each simultaneously execute an operating system therein, and wherein the receive step, the identify step, and the return step are performed by platform firmware, wherein the platform firmware also loads a copy of boot strap code onto the partitions of the logical partitioned data processing system when the partitions are instantiated.

* * * * *